UNITED STATES PATENT OFFICE.

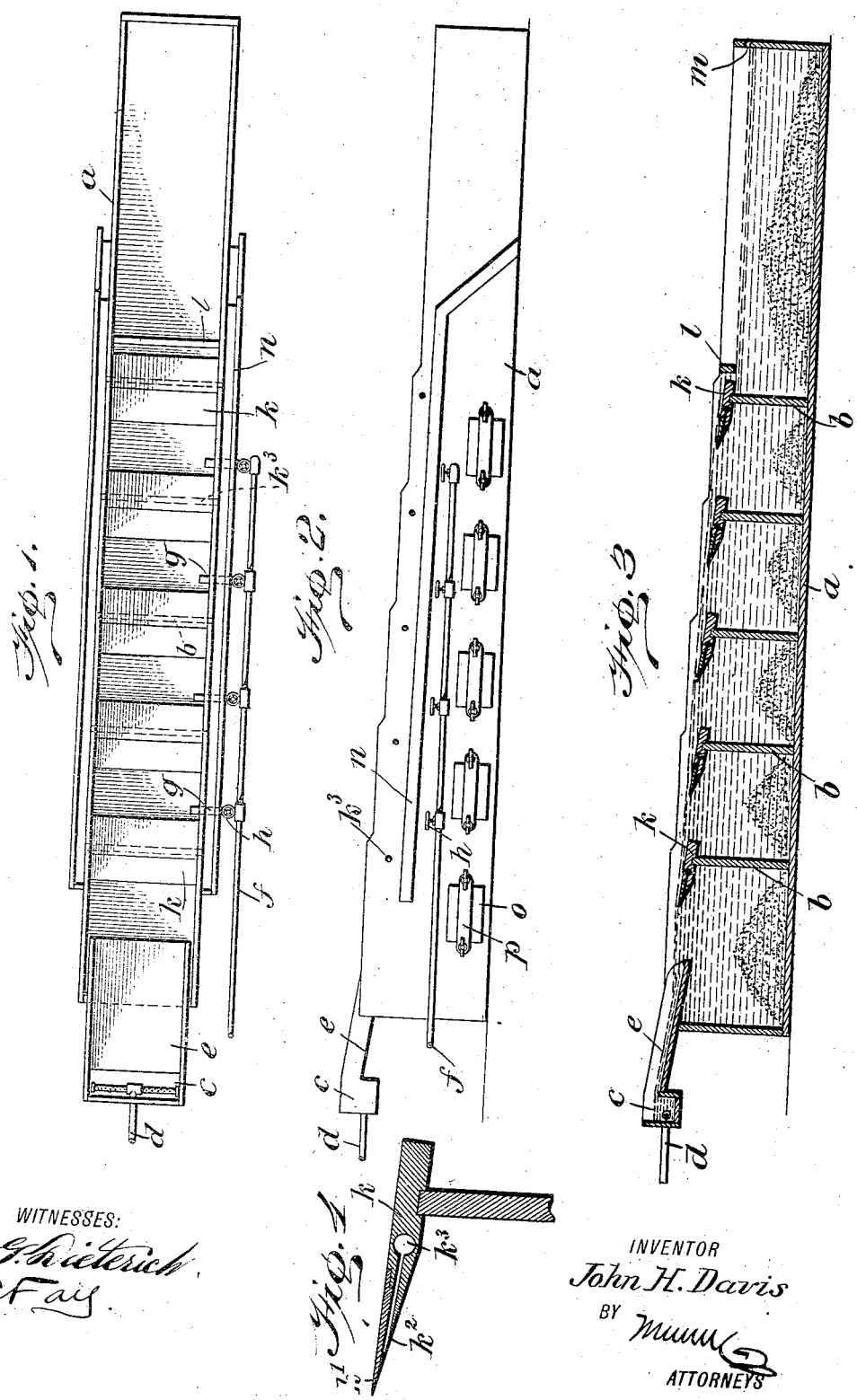

JOHN HENRY DAVIS, OF GLENS FALLS, NEW YORK.

GRAPHITE-SEPARATOR.

No. 816,303.

Specification of Letters Patent.

Patented March 27, 1906.

Application filed May 11, 1905. Serial No. 260,060.

*To all whom it may concern:*

Be it known that I, JOHN HENRY DAVIS, a citizen of the United States, and a resident of Glens Falls, in the county of Warren and State of New York, have invented a new and Improved Graphite-Separator, of which the following is a full, clear, and exact description.

My invention relates to an apparatus for separating graphite from pulverized ore containing it.

The principal objects of the invention are to provide means for effectively separating both fine and coarse graphite and retaining practically all of that material which may be in the ore, for collecting sand and other materials which may be included with the graphite in the ore, to produce graphite in the pure marketable form, and to wash it clean from all foreign matters.

Further objects of the invention will appear in the course of the subjoined description.

Reference is to be had to the accompanying drawings, forming a part of this specification, in which similar characters of reference indicate corresponding parts in all the figures.

Figure 1 is a plan of an apparatus constructed in accordance with my invention. Fig. 2 is a side elevation thereof. Fig. 3 is a longitudinal central sectional view; and Fig. 4 is a sectional view, on an enlarged scale, of the detail shown in Fig. 3.

The apparatus comprises a long trough $a$, having a series of partitions $b$. At one end of the trough is a hopper $c$ for receiving the pulverized ore, the hopper being provided with a pipe $d$, through which water is forced into the hopper. This hopper is provided with a trough $e$, discharging into the first compartment of the main trough. The main trough is filled with water, and aside from that entering through the pipe $d$ its level is kept up by a feeder $f$, which discharges through a series of pipes $g$ into the several compartments of the trough. Each pipe $g$ is controlled by a cock $h$. At the top of each of the partitions is an inclined plate $k$. Each of these plates is provided with a sharpened end $k'$, which is located immediately under the surface of the water in the compartment, and it is provided with a passage $k^2$ for receiving water from just below the surface in order to collect and carry away fine materials separated from the ore. A discharge-passage $k^3$ is provided longitudinally through the plate and communicates with the passage $k^2$. Below the last plate $k$ is a dam $l$, which extends down from the top of the trough to a point below the bottom of the plate. This is provided for the purpose of forcing all materials on the surface of the water downwardly into the body of the water. Discharge-outlets $m$ are located in the end of the trough.

The operation will be readily understood. The ore is introduced into the hopper $c$ and water forced through the pipe $d$, the water at the same time being turned on through the various pipes $g$. The ore flowing down the trough $e$ into the first compartment of the main trough is swept along, and the heaviest part of the flowing materials sink to the bottom, allowing the graphite and fine materials to pass over the plate $k$. Some of the fine materials which are not light enough to remain upon the surface of the water pass through the passages $k^2$ and out through the passages $k^3$. The same operation occurs in each of the compartments until the dam $l$ is reached, and by that time practically all of the sand and gravel, as well as fine materials slightly heavier than the graphite, are separated out. The graphite is then collected in the last receptacle. The overflow through the openings $m$ provides for saving graphite that is so fine that it will pass through No. 21 bolting-cloth. This insures the production of graphite in a marketable form and a saving of a maximum amount of it from the ore. The action of the passages $k^2$ is caused by a current which flows through a passage $k^3$ to the outside of the trough, where it discharges into side troughs $n$ on each side of the tank. The agitation of the water in the several compartments would carry fine sand and mud over the partitions if some such thing were not provided. Each compartment is provided with a door $o$, through which the sand can be removed. Each door is provided with a locking means $p$.

It will be observed that by the use of this apparatus the pulverized ore is accurately divided up, sand of varying degrees of coarseness being collected in the several compartments of the trough, mud and very fine sand being washed out through the side troughs, and graphite in a pure and marketable form being left in the rear end of the main trough, said graphite being entirely washed and freed from foreign materials.

Having thus described my invention, I claim as new and desire to secure by Letters Patent—

1. A graphite-separator, comprising a main trough, means for feeding graphite ore and water thereto, means for maintaining a water-level in the trough, and a series of partitions in the trough, each provided with a separating-plate having its front end located just below said water-level; each of said plates being provided with means for carrying away fine sand and mud from a point near the surface of the water.

2. A graphite-separator, comprising a main trough, means for feeding graphite ore and water thereto, means for maintaining a water-level in the trough, and a series of partitions in the trough, each provided with a separating-plate having its front end located just below said water-level; each of said plates being provided with means for carrying away fine sand and mud from a point near the surface of the water, and each of said plates being located at a lower level than those between it and the point at which the ore enters.

3. A graphite-separator, comprising a main trough, means for feeding graphite ore and water thereto, means for maintaining a water-level in the trough, a series of partitions in the trough, each provided with a separating-plate having its front end located just below said water-level, each of said plates being provided with means for carrying away fine sand and mud from a point near the surface of the water, and a dam located beyond the last plate and extending downwardly from a point above it.

4. A graphite-separator, comprising a trough having a partition, means for maintaining a water-level in the trough, and a plate located upon said partition and projecting inwardly therefrom, the upper surface of said plate being inclined, said plate being provided with means for collecting and discharging fine sand and mud from a point just below the water-level.

5. A graphite-separator comprising a trough having a partition, an inclined plate located on said partition, said plate having a passage opening from a point just below the water-level and means for conveying water from said passage to the outside of the trough.

6. A graphite-separator comprising a trough having a partition, a plate located adjacent to said partition and projecting inwardly therefrom, the upper surface of said plate being inclined and the plate being provided with means for collecting and discharging fine sand and mud from a point just below the water-level.

7. A separator comprising a main trough, a series of partitions therein, each being provided with a separating-plate having its front end located just below the water-level, each of said plates being provided with means for carrying away fine sand and mud from a point near the surface of the water, and a dam located beyond the last plate and extending downwardly from a point above it.

8. A separator comprising a main trough for containing water and a series of partitions in the trough, each provided with a separating-plate having its front end located just below the water-level, each of said plates being provided with means for carrying away fine material from a point near the surface of the water, and each of said plates being located on a lower level than the plates between it and the point at which the material to be operated upon enters the main trough.

In testimony whereof I have signed my name to this specification in the presence of two subscribing witnesses.

JOHN HENRY DAVIS

Witnesses:
 CHARLES H. HITCHCOCK,
 EDWARD B. MICKEY.